United States Patent [19]

Nolan

[11] Patent Number: 4,635,808

[45] Date of Patent: * Jan. 13, 1987

[54] PLASTIC CAP

[75] Inventor: Robert L. Nolan, New York, N.Y.

[73] Assignee: Maxcap, Inc., New York, N.Y.

[*] Notice: The portion of the term of this patent subsequent to Nov. 5, 2002 has been disclaimed.

[21] Appl. No.: 692,908

[22] Filed: Jan. 22, 1985

Related U.S. Application Data

[63] Continuation-in-part of Ser. No. 449,783, Dec. 14, 1982, Pat. No. 4,550,843.

[51] Int. Cl.⁴ .............................................. B65D 41/34
[52] U.S. Cl. .................................... 215/252; 215/321
[58] Field of Search ............... 220/260, 288; 215/252, 215/321, 253, 258, 256

[56] References Cited

U.S. PATENT DOCUMENTS

| | | | |
|---|---|---|---|
| 4,291,813 | 9/1981 | Allen et al. | 215/252 |
| 4,299,328 | 11/1981 | Ochs et al. | 215/252 |
| 4,301,937 | 11/1981 | Von Hagel | 215/252 |
| 4,305,516 | 12/1981 | Pernz et al. | 215/252 |
| 4,394,918 | 7/1983 | Grussen | 215/243 |
| 4,401,227 | 8/1983 | Pehr | 215/252 |
| 4,402,418 | 9/1983 | Ostrowsky | 215/252 |

Primary Examiner—Joseph Man-Fu Moy
Attorney, Agent, or Firm—Abner Sheffer

[57] ABSTRACT

A plastic bottle cap having a tamper indicating skirt with inwardly extending flaps which move to a position in which they decrease the diameter of the skirt and thus prevent removal of the cap while the skirt is connected to the cap.

20 Claims, 15 Drawing Figures 4,635,808

1

PLASTIC CAP

This application is a continuation-in-part of my copending application Ser. No. 449,783 filed Dec. 14, 1982; now U.S. Pat. No. 4,550,843; the entire disclosure of that copending application is incorporated herein by reference.

That copending application described a molded plastic cap for use with a bottle having a neck carrying an outwardly extending thread and having an outwardly extending shoulder beneath said thread. The cap has a top wall, an annular sidewall extending down from the top wall and having an inwardly extending thread for cooperation with the neck thread, and an integral antitamper skirt connected to the side wall. The antitamper skirt has at least a lower portion which, when the cap is fully screwed onto said neck, is at a level below the shoulder of the neck. The skirt also has an integral inwardly projecting flap which is integrally hinged thereto and which, as molded, projects inwardly. The construction and arrangement is such that (a) when the cap moves downward, when it is being screwed on, the flap is engaged by the shoulder of the neck and pushed outward thereby and then, on further downward movement of the cap during that operation, the flap is moved past said shoulder and so moves inward; and (b) when the cap moves upward, when it is being unscrewed, the flap engages the lower part of said shoulder and is forced by said engagement downward and outward into abutting relationship with said lower portion of said skirt so that the presence of said flap decreases the effective internal diameter of the skirt and thus prevents the skirt, while intact, from passing up over the shoulder of the neck.

In the accompanying drawings.

Figure 1:
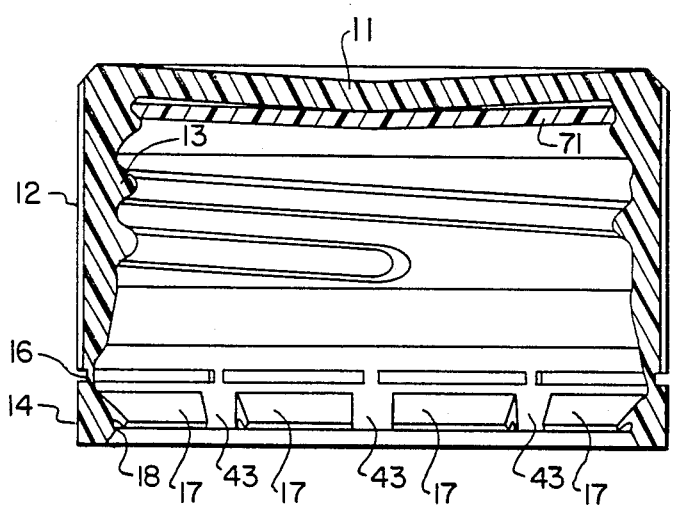
FIG. 1 is a cross-sectional view of a bottle cap.
Figure 2:
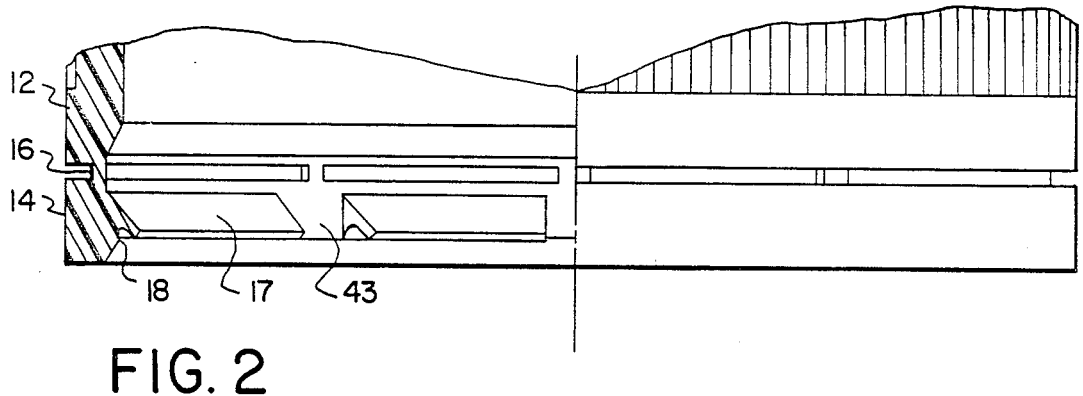
FIG. 2 is a view, partly in cross-section of the lower portion of the cap of FIG. 1.
Figure 8:
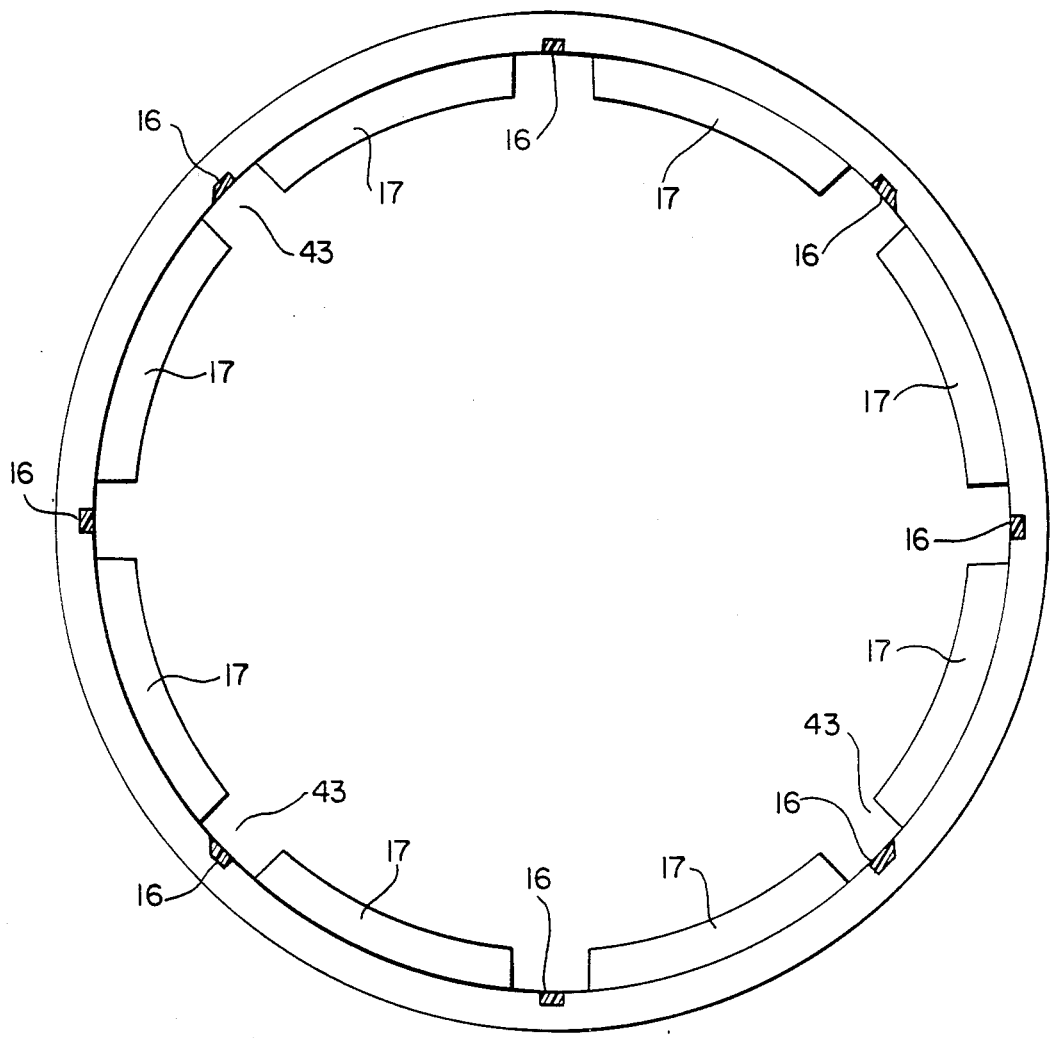
FIG. 8 is a cross-sectional view, in plan, of the skirt portion of a cap, the cross section being taken through the frangible connectors which join that skirt to the main body of the cap.
Figure 9:
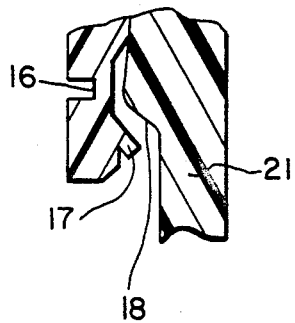
FIGS. 9 and 10 are cross-sectional views, in elevation, illustrating (in FIG. 9) the cap on the bottle and (in FIG. 10) the results of initially unscrewing the cap.
Figure 10:
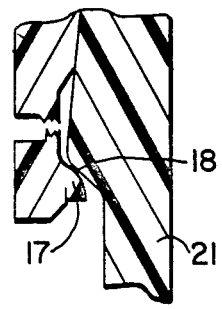

The cap shown in FIG. 1 has a circular top wall 11, a substantially cylindrical upper side wall 12 (having internal threads 13) and a substantially cylindrical antitamper skirt 14 spaced a short distance (e.g., about 1/16 inch) below said upper side wall and connected thereto by frangible connectors 16. These connectors will break (FIG. 10) when the cap is first unscrewed because the skirt is retained by the effect of its inwardly extending integral flaps 17 which are pressed against a lower inward bulge 18 of the skirt by the shoulder 19 of the bottle neck 21 (FIGS. 9 and 10). The skirt will then remain on the neck of the bottle. It is also within the broader scope of the invention to use other connector arrangements such as those illustrated in FIGS. 1, 7-14, 17, 18, 19 and 24 of the parent application Ser. No. 449,783.

Figure 4:
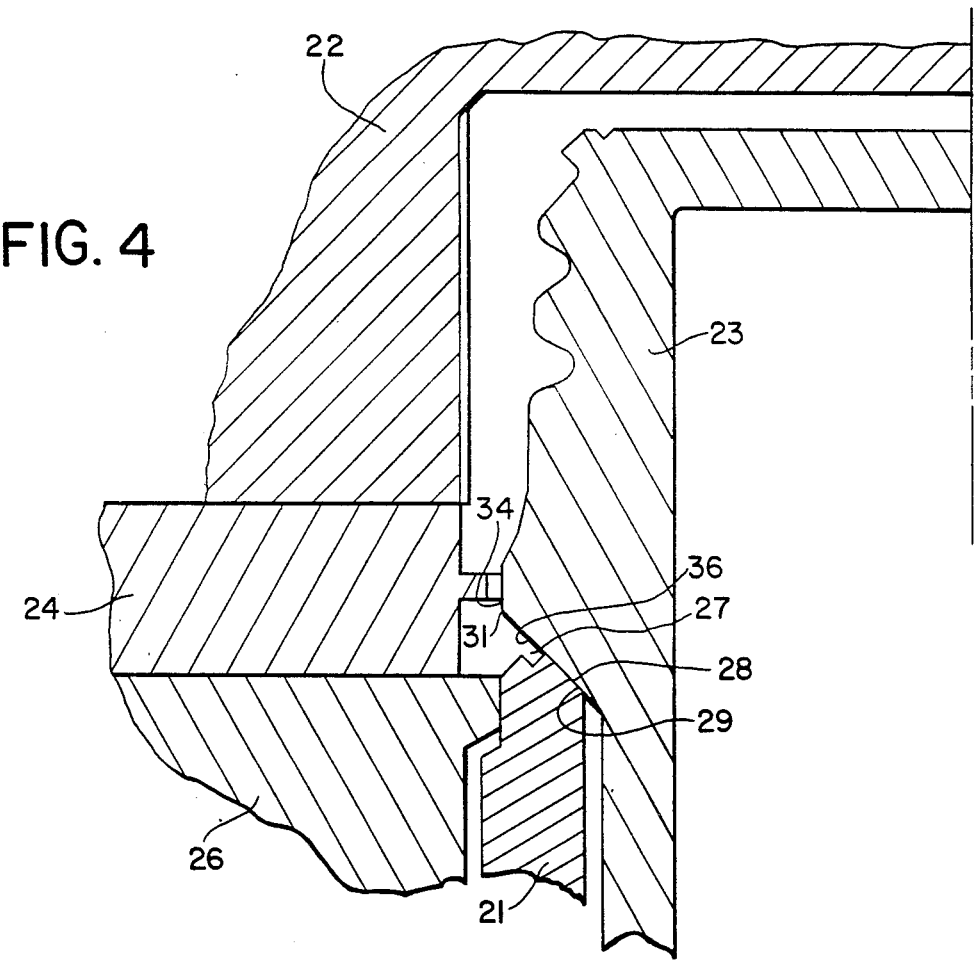
FIG. 4 is a cross-sectional view, in elevation, of portions of a mold, in closed position for receiving injected molten plastic.
Figure 5:
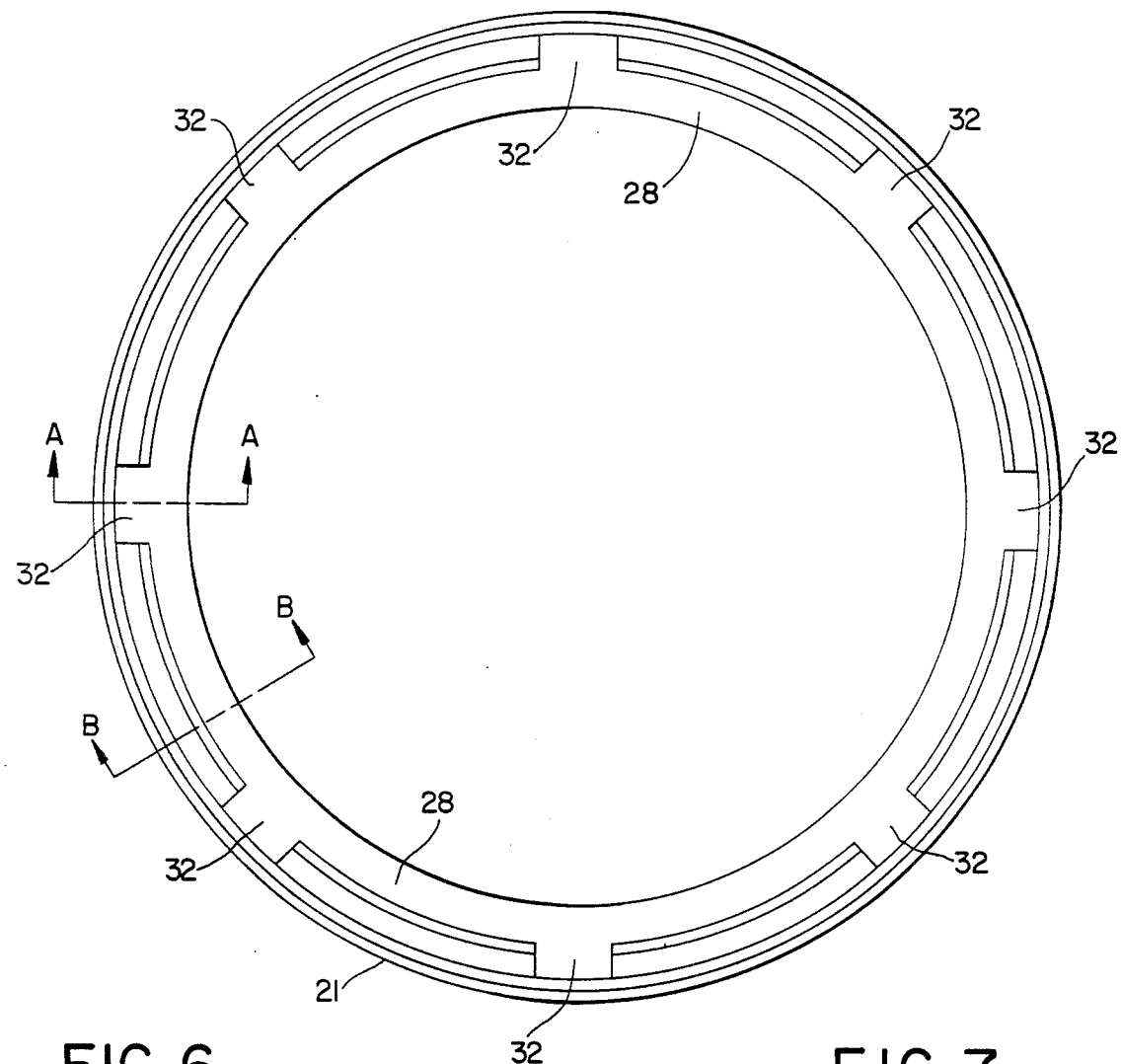
FIG. 5 is a plan view of a supplemental mold core.
Figure 6:
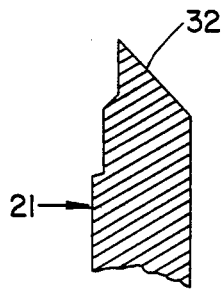
FIGS. 6 and 7 are cross-sections, with a portion broken away, along the lines A—A and B—B, respectively, of FIG. 5.
Figure 7:
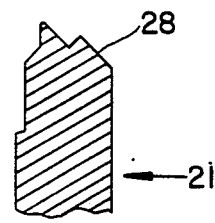

The mold illustrated in FIG. 4 has a supplemental core 21 in addition to its cavity 22, main core 23 cam slides 24 and stripper ring 26. The cam slides serve to define the weakened zone between the upper side wall of the cap and the skirt. The inwardly extending circumferentially spaced flaps 17 of the cap are formed in the pockets 27 situated between the main core and the supplemental core. When the mold is closed (as shown) the inner portion of the supplemental core fits tightly against the main core (e.g. face 28 of the supplemental core abuts against face 29 of the main core) and the outer portion of the supplemental core fits tightly against the stripper ring 26; these close fits are preferably such as to seal in the plastic being molded and avoid the formation of "flash" which would need to be removed after molding.

In the operation of the mold shown in FIG. 4, after the molten plastic has been injected the cavity 22 is moved axially to separate it from the rest of the illustrated parts and the cam slides 24 are withdrawn (i.e., moved outwardly). Then the main core 23 (carrying the molded cap) and the stripper ring 26 (in contact with the bottom of the cap) are moved axially in unison away from the supplemental core 21. Then the stripper ring is moved axially relative to the main core so as to force the molded cap off the core; such movement forces the flaps to swing inwardly (as they are forced against a bulge 31 of the main core), reducing the effective internal diameter of the skirt of the cap, but (as is conventional in the stripping of injection molded caps from cores) the plastic material of the cap is, at that stage, still at an elevated temperature, at which the skirt stretches relatively easily over the bulge and then recovers to substantially its as-molded diameter.

In the embodiment shown in FIG. 4 the face 29 of the main core is frusto-conical, as is the complementary abutting face 28 of the supplemental core. The supplemental core has circumferentially spaced relieved areas (whose faces are substantially parallel to faces 28 and 29), forming the flap-forming pockets 27. Between those relieved areas are continuations 32 of the face 28 of the supplemental core. It will be understood that other pocket-forming arrangements may be used; for instance, less preferably, the face 29 of the main core may have relieved areas and the face 28 of the supplemental core may be unrelieved, or both may be complementarily relieved, etc.

To help each flap pass over the bulge 31 of the main core, the substantially vertical outer face 34 of that bulge is shaped to meet the flap-forming face 36 along a curve (having a radius of, for example, about 0.015 to 0.05 inch, such as about 0.025 inch) and that flap-forming face 36 of the main core is formed at an angle to the axial path of movement of the cap (i.e., its path during stripping), such as an angle of 20° to 60° to the horizontal (i.e., to the plane perpendicular to the axis of the cap). Accordingly, in the cap resulting from the use of such a mold, the inner wall 39 of the cap just above the flap will be similarly curved (along a radius of for example of about 0.015 to 0.05 inch such as about 0.025 inch) and the top 41 of the flap will tend to be at an angle to the horizontal such as an angle of about 20° to 60°.

Figure 12:
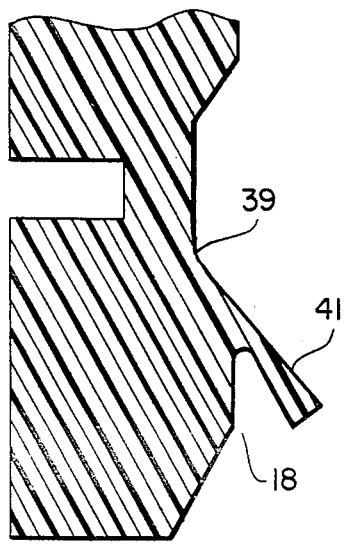
FIGS. 11, 12 and 13 show variations in flap cross-sections.
Figure 11:
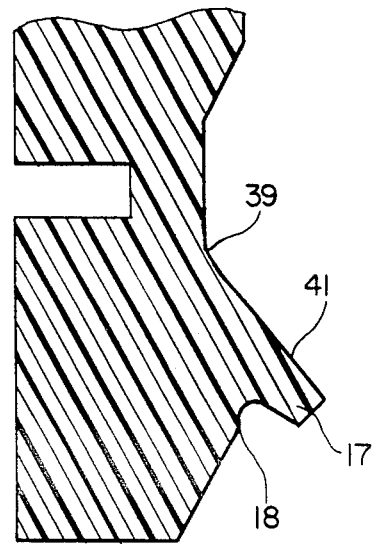
Figure 13:
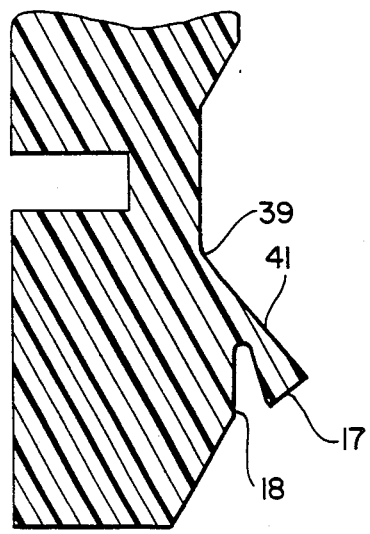

Preferably the construction (including the relative dimensions of the bulge 18 and of the shoulder 19 of the bottle neck) is such that the suitable effective flaps need be only about 0.005 to 0.03 inch thick (more preferably about 0.01 to 0.02 inch thick) at their bulge-abutting portions (i.e., the flap dimensions are such that when the flaps are forced downwardly into abutting relationship with the lower portion of the skirt the flaps effectively decrease the minimum radius of that lower portion by about 0.005-0.03 inch, more preferably by about 0.01-0.02 inch). FIGS. 20-24 of the aforesaid parent application Ser. No. 449,783 (which Figs. are drawn to scale) indicate that each of the flaps shown there is a thin substantially flat element of substantially uniform thickness of about 0.01 inch thick. The flaps described in the present application may similarly be substantially flat elements of substantially uniform thickness (of say, about 0.01 to 0.02 inch). The flaps may also be of nonuniform thickness, e.g., they may be thicker at their inner (free) ends as illustrated in FIGS. 12 and 13. Preferably they are spaced around the inner circumference of the cap in such fashion that each flap-free interval 43 between flaps extends for less than about 80° more preferably less than about 40°. As illustrated in FIG. 8 the flaps may cover, in total, well over half of the inner circumference, such as (in FIG. 8) about 300° of that circumference.

Figure 3:
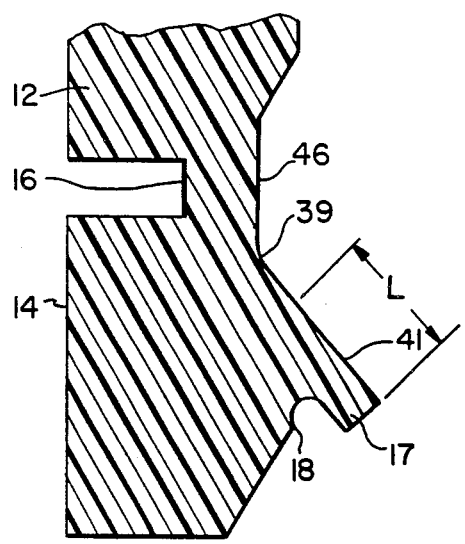
FIG. 3 is an enlarged cross-sectional view of a portion of the cap.

The flaps preferably extend inwards only a short distance so as to minimize any interference with the container threads when the cap is being screwed on to the bottle. For instance, the lengths of the flaps (dimension "1" in FIG. 3) are preferably less than about 0.15 more preferably below 0.1 inch, e.g. about 0.02 to 0.08, such as 0.03, inch. It will also be understood that the internal diameter of the portion 46 of the cap above the flaps is greater than that of the bulge just below the flaps and is such as to receive the flaps when they are forced upwardly by contact with the shoulder of the bottle neck (when the cap is being screwed onto the bottle) so that the presence of the flaps does not interfere undesirably with the downward movement of the bulge 18 past the shoulder 19.

During the operation of stripping the cap from the mold core (and similarly during the operation of initially screwing the cap onto the bottle neck) the connectors 16 may buckle, as illustrated in FIG. 4 of the parent application Ser. No. 449,783, and a lower edge of the side wall 12 of the cap may abut against an upper edge of the skirt 14.

The caps of this invention are particularly suitable for use on bottles whose necks have conventional 28 mm. neck finishes. The invention may also be used for a combination of screw cap and matching squeeze bottle, the top wall of the cap having a central hole through which the contents of the bottle may be dispensed when the cap is partly unscrewed. As shown in FOG. 14 the spout 51 of the squeeze bottle projects into the central hole 52 of the cap 53 and the ports 54 of that spout are sealed by contact with the cap when the cap is fully screwed on. In exactly the same manner as is used for the illustrated embodiment in which the cap has an imperforate top wall, the cap having the hole 52 in its top wall may have a tamper-indicating skirt 14 with flaps 17 as described herein to cooperate with a shoulder 18 on the neck of the squeeze bottle.

Figure 14:
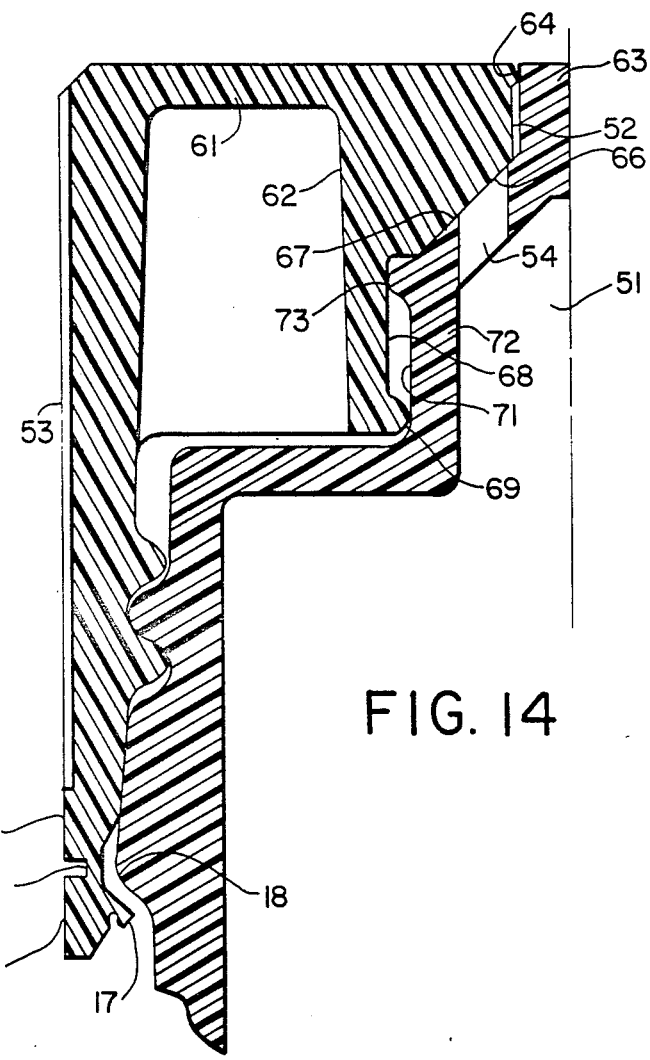
FIG. 14 is a cross-section, in elevation, of half of the upper portions of a perforated cap and squeeze bottle.

In the construction shown in FIG. 14 the top wall 61 of the cap is formed with a central depending inner skirt 62 (whose outer surface may be cylindrical) and has a central upper cylindrical hole 52 for receiving the solid top portion 63 of the spout 51 with a press-fit, owing to inwardly extending circumferential bead 64 at the mouth of hole 52. The skirt 62 also has a conical inner surface 66 for engaging and sealing against a correspondingly conical outer surface 67 of the spout (through which surface 67 the spaced ports 54 of the spout pass). The ports 64 may be, for instance, arcuate in plan view, e.g. each port may extend over an arc of some 45° centered on the axis of the spout. The skirt 62 also has a lower inner cylindrical surface 68 of larger diameter, having a lower inwardly extending circumferential bead 69 on which the cylindrical lower outer surface 71 of the base 72 of the spout 51 is adapted to ride when the cap is screwed on or off. At the top of the spout base 72 there is an outwardly extending circumferential bead 73 which similarly rides against the inner cylindrical surface 68. When the cap is initially screwed onto the squeeze bottle bead 69 snaps over bead 73. These beads serve to limit the length of travel of the cap after the cap has been screwed on, and thus avoid accidental and unnecessary removal of the cap in use.

Figure 15:
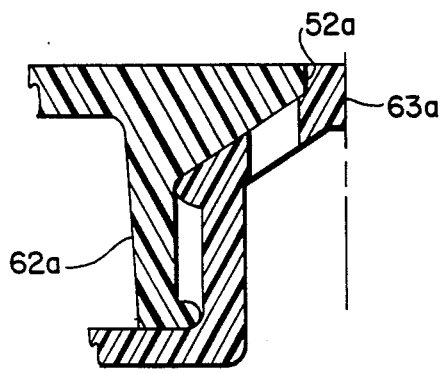
FIG. 15 is a cross-section of a portion of a variation of FIG. 14.

FIG. 15 illustrates a preferred modification using a spout having a shorter solid central top portion 63a and a corresppndingly shorter central hole 52a and thus a shorter inner skirt 62a, there being a press-fit between that top portion 63a and the inner surface of hole 52a.

In use, after the cap has been partly unscrewed and the desired amount of the contents of the squeeze bottle (e.g. chocolate syrup, ketchup, toothpaste, pasty mustard, etc.) has been dispensed, the ca cap is screwed down again and the material in the hole 52 (or 52a) and in the space between the conical surfaces 66,67 is forced back into the interior of the spout. Thus there is practically none of the material left exposed on the top of the cap or in a place where it can dry out.

Conventional high speed capping machinery, as described in the parent application Ser. No. 449,783, with capping heads which grip the upper side wall 12 of the cap but not the skirt 14, may be employed for screwing the caps of this invention onto the necks of the bottles. Before the cap is put on the bottle, the liner or gasket 71 (FIG. 1) may be conveniently inserted or deposited into the cap using conventional cap-lining machinery without the need for special, or additional, operations.

It is understood that the foregoing detailed description is given merely by way of illustration and that variations may be made therein without departing from the spirit of the invention.

I claim:

1. A molded plastic cap for use with a bottle having a neck carrying an outwardly extending thread and having an outwardly extending shoulder beneath said thread, said cap comprising a top wall, an annular sidewall extending down from said top wall and having an inwardly extending thread for cooperation with said neck thread, and an integral antitamper skirt below said side wall and connected thereto, said skirt having at least a lower portion which, when the cap is fully screwed onto said neck, is at a level below said shoulder, said skirt having also a plurality of circumferentially spaced integral inwardly projecting flaps which are integrally hinged thereto and which as molded project inwardly, the construction and arrangement being such that (a) when during the operation of screwing said cap onto said neck, said cap moves downward, said flaps are engaged by said shoulder and pushed outward thereby and then, on further downward movement of said cap during said operation, said flaps are moved past said shoulder and (b) when, during the operation of unscrewing said cap from said neck, said cap moves upward, said flaps engage the lower part of said shoulder and are forced by said engagement downward and outward into abutting relationship with said lower portion of said skirt so that the presence of said flaps decreases the effective internal diameter of said lower portion of said skirt so as to prevent said skirt, while intact, from passing up over said shoulder, said cap having (i) above the zones where said flaps are intergrally attached to said skirt, a first portion having an inner surface toward which said flaps swing during said screwing-on operation and (ii) below said zones, a second portion having an inner surface against which said flaps abut during said unscrewing operation, said second portion having a diameter less than that of said first portion.

2. A cap as in claim 1 in which there are frangible connectors connecting said side wall to said skirt, the construction being such that, on said unscrewing, said connectors break owing to said prevention of upward movement of said skirt, and said skirt is left on said neck.

3. A cap as in claim 1 said flaps being molded as thin flexible inwardly extending elements each having a lower face and an upper face, the construction and arrangement being such that during said screwing-on operation said lower face is engaged by said shoulder and during said unscrewing operation said upper face is pressed against said lower part of said shoulder thereby pressing said lower face against said lower portion of said skirt to decrease the effective internal diameter of said lower portion of said skirt so as to prevent said skirt, while intact, from passing up over said shoulder.

4. A cap as in claim 1, said cap having (a) above the zones where said flaps are integrally attached to said skirt, a first portion having an inner surface toward which said flaps swing during said screwing-on operation and (b) below said zones, a second portion having an inner surface against which said flaps abut during said unscrewing operation, said second portion having a diameter less than that of said first portion.

5. A cap as in claim 4, each of said flaps having an upper face which meets the inner surface of said first portion of said cap along a curve having a radius of at least about 0.015 inch.

6. A cap as in claim 5 in which said radius is about 0.015 to 0.05 inch.

7. A cap as in claim 4 in which said flaps are spaced from each other by intervals and are independently movable.

8. A cap as in claim 7 in which said intervals are each less than about 80°.

9. A cap as in claim 7 in which said intervals are each less than 40°.

10. A cap as in claim 7 in which said flaps cover a total of more than half of the inner circumference of said skirt.

11. A cap as in claim 7 in which the outer diameter of said sidewall and skirt are substantially equal.

12. A cap as in claim 11 in which said flaps cover a total of more than half of the inner circumference of said skirt, said intervals correspondingly covering a total of less than half of said circumference, and in which there are circumferentially spaced frangible connectors extending integrally between said side wall and said skirt.

13. A combination of a cap as in claim 1 with a bottle as described in claim 1.

14. A combination of a cap as in claim 2 with a bottle as described in claim 2.

15. A combination of a cap as in claim 12 with a bottle as described in claim 12.

16. S A cap as in claim 1 in which said skirt is outwardly imperforate.

17. A cap as in claim 16 in which said skirt is outwardly smooth and imperforate.

18. A cap as in claim 1 in which the top wall of the cap is imperforate.

19. A cap as in claim 1 in which the top wall of said cap has a hole through which the contents of a bottle carrying said cap may be dispensed from a spout of said bottle, the construction and arrangement being such that said cap seals said spout when the cap is fully screwed onto the neck of said bottle.

20. A combination as in claim 13; said bootle having a dispensing spout, said cap having in its top wall a hole through which the material dispensed from said spout passes, a the construction and arrangement being such that said cap seals said spout when the cap is fully screwed onto the neck of said bottle.

* * * * *